US008560489B2

(12) United States Patent
Kaufman

(10) Patent No.: US 8,560,489 B2
(45) Date of Patent: Oct. 15, 2013

(54) SYSTEM AND METHOD TO MEASURE CONTINUED ENGAGEMENT WITH SOFTWARE APPLICATION

(76) Inventor: Adam Kaufman, Los Angeles, CA (US)

( * ) Notice: Subject to any disclaimer, the term of this patent is extended or adjusted under 35 U.S.C. 154(b) by 272 days.

(21) Appl. No.: 13/247,960

(22) Filed: Sep. 28, 2011

(65) Prior Publication Data

US 2012/0078838 A1 Mar. 29, 2012

Related U.S. Application Data

(60) Provisional application No. 61/387,406, filed on Sep. 28, 2010.

(51) Int. Cl.
*G06F 9/44* (2006.01)
*G06F 21/00* (2013.01)
*G06N 5/04* (2006.01)
*G06Q 20/38* (2012.01)

(52) U.S. Cl.
CPC .............. *G06N 5/048* (2013.01); *G06Q 20/382* (2013.01)
USPC .............................................. 706/52; 705/50

(58) Field of Classification Search
None
See application file for complete search history.

(56) References Cited

U.S. PATENT DOCUMENTS 8,041,642 B2 * 10/2011 Lenard et al. .................. 705/59
2008/0162352 A1 * 7/2008 Gizewski ....................... 705/50

* cited by examiner

*Primary Examiner* — Alan Chen
(74) *Attorney, Agent, or Firm* — Pillsbury Winthrop Shaw Pittman LLP

(57) ABSTRACT

A computing device includes a database, software code, and a processor. The software code, when executed by the processor, causes the computing device to predict users continued engagement with an external software application. The predictive software application transmits a data request to a database of an external software application, the requested data corresponding to a plurality of engagement variables for a set of users of the external software application. The predictive software application receives extracted data for the plurality of application engagement variables and stores the extracted data in a prediction database. The predictive software application calculates a weighting factor, identifying impact on future use, for each of the plurality of application engagement variables based on the analyzing of the extracted data for the plurality of application engagement variables. The predictive software application transmits the plurality of application engagement variables and the corresponding weighting factor to the existing application.

10 Claims, 3 Drawing Sheets

EngagePredict software application pulls 201 an extract of the PARx database including information regarding the defined engagement variables for each user for each week — 201

The EngagePredict software application performs 202 statistical optimization utilizing the extracted data to estimate which engagement variables most impact a user's future engagement with the PARx software application — 202

The EngagePredict software repeats the statistical optimization process until the best (e.g., most statistically significant) set of engagement variables and estimates/weighting factors have been identified 203 for the PARx software application. — 203

The EngagePredict software application automatically transmits 204 the identified engagement variables and their impact/weighting back to PARx software application. — 204

Within the PARx software application, the engagement variables and associated weighting factors are used to estimate 205 future engagement as each user progresses through the PARx software application — 205

SYSTEM AND METHOD TO MEASURE CONTINUED ENGAGEMENT WITH SOFTWARE APPLICATION

RELATED APPLICATION

This application claims priority to provisional application Ser. No. 61/387,406, filed Sep. 28, 2010.

BACKGROUND

Many software applications expect users to return over time to the application. Generally these applications engage users in work that needs to be completed over calendar time. In particular, software applications designed to help individuals change behavior incorporate a dynamic workflow that encourages a user to conduct different activities at different times. These applications can be deployed via web, cell phone or client-server interfaces.

A key challenge for tools that expect ongoing, overtime use by users (like these software applications) is managing ongoing engagement with the tool itself. Use of the tool (software application) is often a pre-requisite for the other desired actions by users.

The inability to model and predict future engagement of current users presents a problem for software application operators as they cannot adjust program features, or outreach protocols to improve return engagement. These software applications face the problem that they cannot optimize the user experience to maximize the likelihood of return and thus cannot maximize program success.

Current technologies do not provide appropriate tools to model and predict the likelihood that a user will return to the application in the future. These technologies rely on basic regression models, correlation analysis, or appeal to best practices or user surveys to gather information on the determinants of repeat use. These solutions do not fully utilize the existing data on actual user engagement to form individualized models able to provide prediction of future return.

Accordingly, there is a need by software application developers and operators for predicting the likelihood of continued engagement with a software application.

SUMMARY

In order to address this need, a system and method (named EngagePredict) has been developed to measure the likelihood of continued engagement of a software application by a user. EngagePredict is designed to model and assess the likelihood that a user will continue to use an application given that they have used the application up to a certain point. The modeling takes into account user characteristics, past actions on the tool and unobserved heterogeneity among the population. The EngagePredict software application creates a statistical model of expected dynamic engagement.

The primary problem solved by EngagePredict is that of how to predict if a user who has used a software program tool up to a certain date, will continue to use the tool in the future. For example, there are several software applications—delivered as internet web applications—that aim to help users improve their diet behaviors and eat healthier. The applications aim to help a user adopt healthier food choices by improving the user's behaviors over a time period. The success of these software applications depend on users returning to the software applications day after day and week after week. The users are expected to return to the software application to log their food consumption, take lessons, receive messages and/or take part in other activities. Given that repeated use and return visits are key to program success, providers of these applications are interested to understand and predict whether users will return.

DETAILED DESCRIPTION OF ILLUSTRATIVE IMPLEMENTATIONS

The EngagePredict software application leverages data on use of a system with an existing software application (which is external and different from the EngagePredict software application) and most importantly users' continuing software application use to build a statistical model to predict future use of the software application. The EngagePredict software application extracts data from the currently running software application, develops a statistical model of ongoing program use by analyzing key variables (or parameters), and then applies that statistical model to users to predict their future engagement with the currently running program.

Figure 1A:
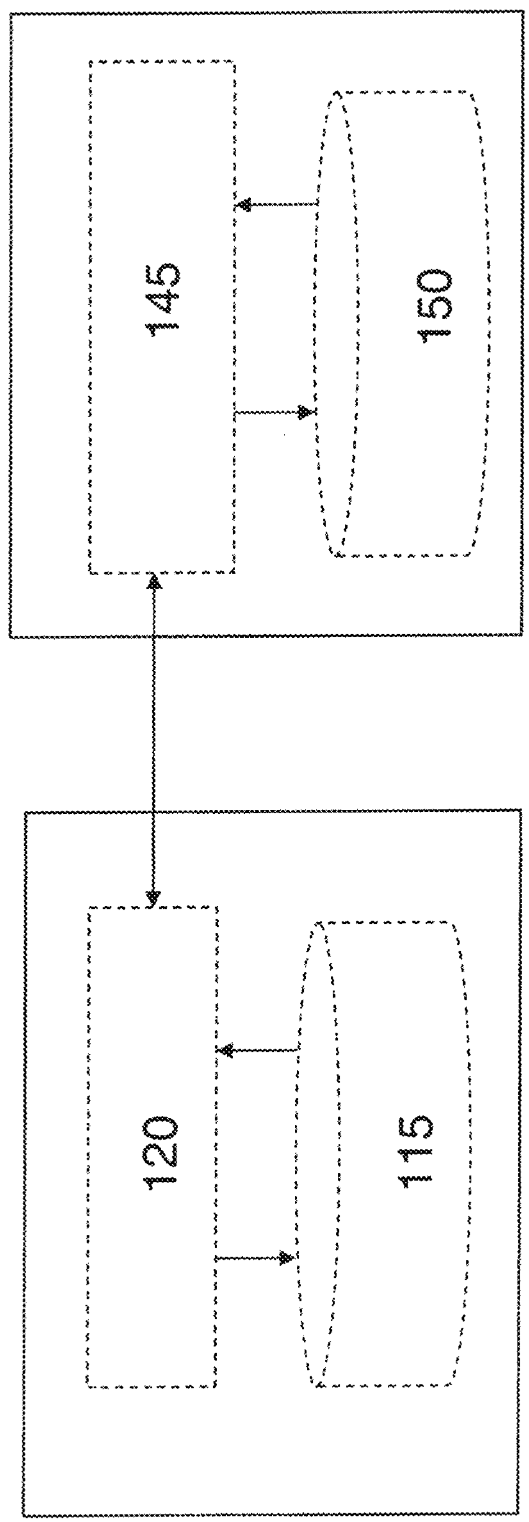
FIG. 1A illustrates a system including an existing software application and a engagement prediction software application according to an embodiment of the invention.

FIG. 1A illustrates a system including an existing software application and a engagement prediction software application according to an embodiment of the invention. EngagePredict is a software application 140 utilizing a data warehouse (e.g., a prediction database 150) and a statistical algorithm or module to predict continued engagement of the user. The results of using EngagePredict software application are: (1) a statistical model of the factors impacting continued engagement with an existing software application, and (2) time-sensitive, individual predictions of the likelihood that a particular user will continue to engage with the software application. A computing device 110 includes an existing software application 120 (that may be on a separate computing device or server from the EngagePredict software application) and a database 115 utilized by the existing software application 120. Each of the computing devices 110 and 140 include at least a non-volatile software medium (e.g., flash memory, hard disk drive, removable drive), a processor, and operating memory (e.g., RAM). Upon initiation, the existing software application 120 or the EngagePredict software application 145 are loaded into the respective operating memories of their respective computing devices. Instructions from each of the software applications will be executed by the processor of the respective computing devices. Results from the execution of the program may update databases resident on either of the computing devices or may update sections of either of the software applications (either the existing software application or the EngagePredict software application.

Figure 1B:
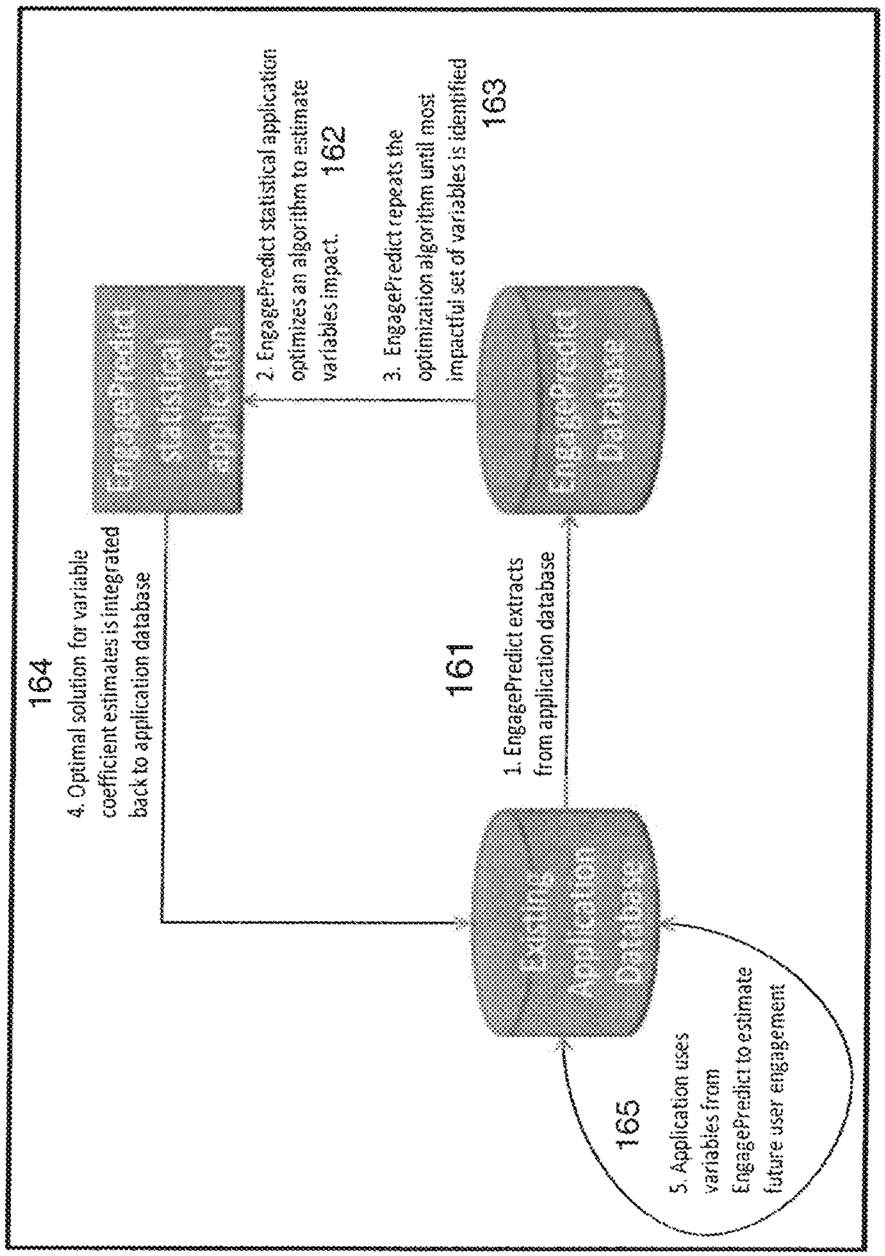
FIG. 1B illustrates a dataflow diagram of an existing software application and an engagement prediction software application according to an embodiment of the invention.

FIG. 1B illustrates a dataflow diagram of an existing software application and an engagement prediction software application according to an embodiment of the invention.

In the existing software application, key variables or parameters for predicting continued software engagement are identified. The existing software application 120 stores values of the key variables in the database 115 for the existing software application 120. The key variables may be referred to as engagement variables. Under certain operating conditions, the EngagePredict software application 145 pulls (or extracts) 161 a copy of the relevant variables values for a time period for users from the analyzed application's runtime database 115 by communicating with the existing software application 120. For example, the EngagePredict software application could extract engagement variable values for a set of users. The users may be all users or may be all users that meet a certain profile (e.g., age range and/or gender). The EngagePredict software application may store the copied engagement variable values in the database 150 utilized by the EngagePredict software application. The database 150 may be referred to as a prediction database.

Utilizing the engagement variable values, the EngagePredict software application 145 runs or executes 162 an optimization routine to identify each of the engagement variable's impact on future engagement of a user. The EngagePredict software may utilize data for similar engagement variables from other software applications in determining the engagement variables' impact for the analyzed (or existing) software application 120. In some implementations, the EngagePredict software application may utilize data from a set of users running the existing application in determining the engagement variables' impact for the analyzed software application 120. In some implementation, a maximum likelihood estimator with numerical optimization routines is utilized as the optimization routine. Illustratively, the EngagePredict software application assesses the weights of each variable in predicting ongoing engagement with the analyzed application. In implementations, the optimization routine may be repeated until a set of statistically significant engagement variables are identified 163. The EngagePredict software application also generates weighting factors for the engagement variables to identify the impact of each of the engagement variables on whether or not a user will continue engagement with the existing software application 120. In some implementations, the EngagePredict software application may generate a user engagement prediction percentage based on the engagement variable data and the associated weighting factors.

Illustratively, the weighting factors are parameters of a mathematical model defined as the likelihood of ongoing engagement. The model may be a statistical estimator using the sample data extracted from the existing software application (which is a sample of the population data). The weighting factors may be determined or estimated by running optimization algorithms that use one of several optimization routines to calculate the best estimates of the parameters or weighting factors.

After the significant engagement variables have been identified and the weighting factors have been generated, the EngagePredict software application may transmit the weighting factors (coefficient estimates) back to the existing software application 120. The existing software application 150 store the weighting factors in the database 115 utilized by the existing application. In some implementations, a future engagement software module in the existing software application 120 receives the weighting factors for engagement variables. The future engagement software module utilizes the weighting factors for the engagement variables and automatically analyzes this against the stored data in the database 115 of the existing software application to predict 165 future user engagement for the existing software application. The prediction percentage may be stored in the existing application database 115 for use in further prediction percentage calculations.

As an illustrative example, DPS Health™ launched a web software application called The Physical Activity Prescription (PARx). The PARx software application emulated a physical activity coach to help an individual or user gradually engage in more physical activity. In order to obtain maximum benefit for the user, the user was expected to return to the website to access the PARx software application several times a week. At the PARx software application running on the PARx website, the user could track previous activities, review progress against goals and plan activities for the following week. DPS Health™ discovered that a number of users would cease to use the PARx software application and that this decrease in user engagement happened at different times for different users. In other words, some users used the PARx software application for one week, others used the PARx software application for only several weeks and yet others used the PARx software application for many months.

DPS Health may utilize the EngagePredict software application to understand and predict if a user was approaching the point where he/she was going to stop using the PARx software application. EngagePredict uses the engagement data of previous users for the PARx software application (which is stored in the database utilized by the PARx application) to assess which individual variables impact future use. In order to integrate the PARx software application with the EngagePredict software application, a set of engagement variables were defined. Illustratively, in the PARx software application, the variables of user age, user gender, user's previous week's activity level, user's previous week's goal attainment, and user's previous week's content access, were defined as the statistically significant engagement variables along with the dependent variable of whether the user engaged with PARx. With these engagement variables defined, the EngagePredict software application was executed.

Figure 2:
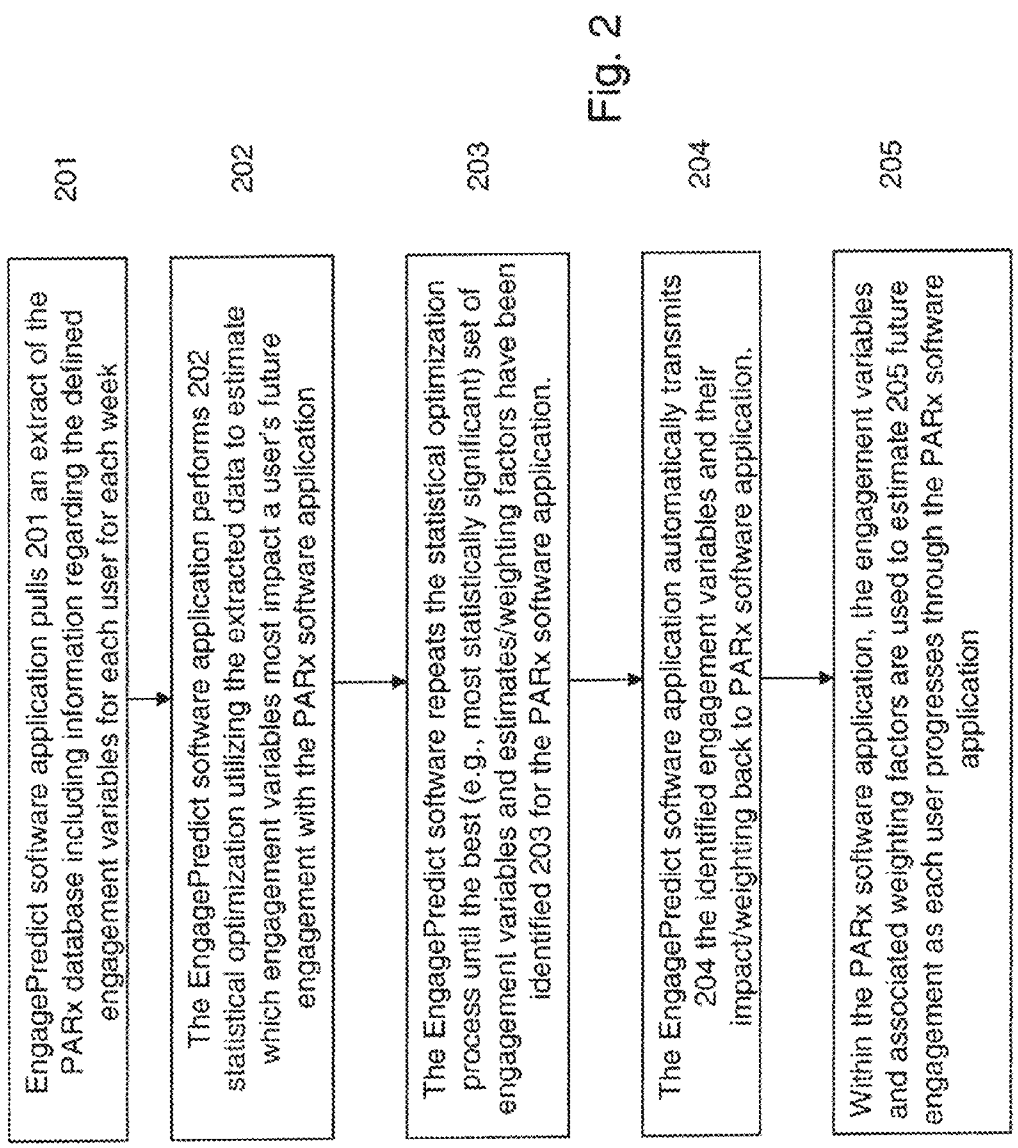
FIG. 2 illustrates a flowchart of the EngagePredict software application utilized with the Physical Activity Prescription (PARx) software application according to an embodiment of the invention.

FIG. 2 illustrates a flowchart of the EngagePredict software application utilized with the PARx software application according to an embodiment of the invention. The EngagePredict software application pulls 201 an extract of the PARx database including information regarding the defined engagement variables for each user for each week. In some implementations, information regarding the defined engagement variables is pulsed for a set of users for each week. The EngagePredict software application performs 202 statistical optimization utilizing the extracted data to estimate which engagement variables most impact a user's future engagement with the PARx software application. This results in estimates of the impact of each variable on predicted future use. These may be referred to as weighting factors for the engagement variables. The EngagePredict software repeats the statistical optimization process-until the best (e.g., most statistically significant) set of engagement variables and estimates/weighting factors have been identified 203 for the PARx software application. The EngagePredict software application automatically transmits 204 the identified engagement variables and their impact/weighting back to PARx software application. Within the PARx software application, the engagement variables and associated weighting factors are used to estimate 205 future engagement as each user progresses through the PARx software application. The end result is a probability (or percentage) that, given the user's characteristics and past history, the user will stay engaged and access the PARx software application in the future.

In another implementation of the invention, the EngagePredict software application may be utilized to predict engagement of a web software application with a database of user characteristics and user engagement of logon data. The web software application will collect initial, non-changing, user characteristics such as gender and height. Additionally, the web software application will collect time-changing information such as user weight and program specific information such as food consumed by users on a given day. A user is expected to log on to the web software application with some frequency and the web software application would store the date of all user logons along with any input or calculate data.

In this implementation, the EngagePredict software application would operate as follows. The web software application would be analyzed and it would be determined which non-time changing and which time changing user variables (e.g., engagement variables) would impact ongoing web software application use. These engagement variables would be mapped to the appropriate database fields in the web software application database. Data from the engagement variables database fields for a user or set of users would be extracted from the web application database under control of the EngagePredict software application and this information stored in the EngagePredict database. Each record of the engagement variable in the EngagePredict database would represent the individual information for each user for each defined period of time. For example, when the engagement variables have been defined as height, weight, calorie consumption and exercise activity, the database record in the EngagePredict database would record the user's height, weight, calorie consumption and exercise activity in each week.

The EngagePredict software application would pull or extract the users' logon information from the web software application and then the logon information would be associated with each record in the EngagePredict database as the dependent variable measuring engagement. The EngagePredict software application would solve the unconditional hazard algorithm to identify the optimal values of the coefficients on each of the defined engagement variables. In other words, the EngagePredict software application would run an optimization routine against the EngagePredict data as modeled. Weighting factors or coefficients would be generated for each of the defined engagement variables. The EngagePredict software application would transfer the weighting factors (coefficients) to the web software application and then the web application database. A future engagement module (or routine) of the web software application would be updated to include a calculation of predicted future engagement using the newly estimated weighting factors/coefficients. The estimated weighting factors/coefficients would be updated on a regular basis by repeating the above-identified steps.

The preferred embodiment is to implement the EngagePredict software application is to have the software application extract data from the production database of a web application and/or cell phone application into a separate EngagePredict database. In this model, the EngagePredict software application runs as a separate application from the base web or cell phone application. Future embodiments of the EngagePredict software application would have the EngagePredict software application integrated directly into the web software application and operating off of the web application production database. Additional embodiments of the EngagePredict software application would extend prediction beyond simply predicting future use of the web software application to predicting other future behaviors such as future weight of the user depending on current and past weights. Lastly, future embodiments would extend beyond web software applications and cell phone software applications to use the EngagePredict software application to predict use of client server and computer resident applications.

In one implementation of the EngagePredict, software application, the EngagePredict application implements a version of a conditional hazard model used in econometric analysis (see Ham and Rea (1987) "Unemployment Insurance and Male Unemployment Duration in Canada" Journal of Labor Economics 5:3 325-353) to perform engagement variable optimization. This conditional probability will depend on the defined individual, intervention and dynamic characteristics in the particular application setting. The conditional probability function is given by $\lambda_s=\lambda_s(t_{os},t;X_{ts},\theta_{ts},k)$ where $X_{ts}$ represents the values of the characteristics at time $t_{os}$+t, and $\theta_{ts}$ a particular exogenous shock and k represents an unobservable heterogeneity. This shock is assumed independent across individual engagement durations and time. $\lambda_s$ is implemented as a logit probability'model shown in (1).

$$\lambda_k(t_{0s},t;X_{ts},\theta_{ts},k)=1/\lfloor 1+\exp(-(c_k+X'_{ts}\beta+h(t_{os},t)))\rfloor \quad (1)$$

Where c represents a constant, $X_{ts}$ the vector of characteristics and h(.) a function of the current duration. Note that the X function is specific to the particular unobserved heterogeneity k.

The algorithm maximizes the likelihood of observing the pattern of durations in the data conditional on the specified hazard function (1). The algorithm improves precision of its estimates by including user durations that have already ended and those that are still ongoing. For completed durations, the duration's starting period $t_{os}$ and end period $t_s$* are observed and thus the duration ends in the period $t_{os}+t_s$*. The probability of observing that particular completed duration is given by:

$$g_k(t_{0s},t_s^*)=\left\{\prod_{t=1}^{t_s^*-1}[1-\lambda_k(t_{0s},t)]\right\}\lambda_k(t_{0s},t_s^*) \quad (2)$$

Given that there are potential n multiple types of k the expected value, given in the following sum, represents the likelihood of observing a completed spell.

$$g(t_{0i},t_i^*)=\sum_{k=1}^{n} g_k(t_{0s},t_s^*;k)prob(k) \quad (3)$$

Where the conditioning on Xts and $\theta_{ts}$ are still present but dropped for notational simplicity. For not completed durations, the user is still engaged with the application and there is no information on when engagement terminates. The information on these durations concludes at some $\bar{t}_s$ after which no information is observed. The probability of observing such a duration is given by the survivor function:

$$[1-G_k(t_{0s},\bar{t}_s)]=\prod_{t=1}^{\bar{t}_s}[1-\lambda_k(t_{0s},t;k)] \quad (4)$$

Similarly the likelihood of observing the not-completed duration is given by the sum over k.

$$[1 - G(t_{0i}, t_i)] = \sum_{k=1}^{n} [1 - G_k(t_{0s}, \bar{t}_s; k)]prob(k) \tag{5}$$

Thus denoting the observations with completed durations by C and those with not-completed durations as IN, the likelihood of observing the given pattern of application usage can be modeled as follows:

$$L = \prod_{i \in C} g(t_{0s}, t_s^*) \prod_{i \in IN} [1 - G(t_{0s}, \bar{t}_s)] \tag{6}$$

The EngagePredict software application proceeds to estimate the magnitude and statistically significance of the β parameters by maximizing the function in equation (6). These parameters represent the impact of the time-changing and time-changing characteristics on the probability that the user will continue to engage with the software application at time t given that the user has engaged up until time t−1. The algorithm implemented in the EngagePredict software application proceeds to estimate the magnitude and statistically significance of the β parameters by maximizing the function in equation (6). The EngagePredict software application implements a computational maximization function that searches over the possible parameter space updating the parameter estimates until the parameter values (e.g., engagement variables) that yield the highest value of (6) are found. In essence, this algorithm implemented in the Engagement software application maximizes the likelihood that the observed patterns of engagement would be the actually patterns of engagement given the observable data. Given the estimated, statistically significant parameters engagement variables) found in the algorithm, the EngagePredict software application can estimate the probability that the application user will stay engaged.

A number of embodiments have been described. Nevertheless, it will be understood that various modifications are optionally made without departing from the spirit and scope of this disclosure. Accordingly, other embodiments are within the scope of the following claims.

The invention claimed is:

1. A computer-implemented method wherein software code residing on a computing device, when executed, causes the computing device to predict a user's continued engagement with an external software application, comprising:

(a) transmitting a request for data to a database of an external software application, the requested data corresponding to a plurality of engagement variables for a set of users of the external software application;

(b) receiving extracted data corresponding to the transmitted request for the plurality of application engagement variables and storing the extracted data for the plurality of application engagement variables in a prediction database;

(c) calculating a weighting factor for each of the plurality of application engagement variables based on the analyzing of the extracted data for the plurality of application engagement variables, the weighting factor of each application engagement variable identifying whether the application engagement variable impacts future use of the external software application; and (d) transmitting the plurality of application engagement variables and the corresponding weighting factor to the external software application.

2. The computer-implemented method of claim 1, further including:

transmitting a user continued engagement prediction percentage to the external software application.

3. The computer-implemented method of claim 1, wherein an unconditional hazard algorithm is utilized to calculate the weighting factor for each of the application engagement variables.

4. The computer-implemented method of claim 1, wherein the application engagement variables include a user's height, a user's weight, a user's calorie consumption, a user's exercise amount and the extracted data includes a plurality of values of each of the application engagement variables for a specified time.

5. The computer-implemented method of claim 1, wherein steps 1(*a*), 1(*b*), 1(*c*) and 1(*d*) are automatically performed on a periodic basis and an updated user continued engagement prediction percentage is transmitted on the periodic basis to the external software application.

6. The computer-implemented method of claim 1, wherein calculating the weighting factor includes repetitively running an optimization routine to identify the impact of the each of the application engagement variables until at least on of the weighting factor reaches a threshold value.

7. A computing device, having installed thereon software code that when executed executes a software application, the software application utilizing a database housed on the computer, the software application causing the computing device to:

(a) receive physical activity data of a user over for a timeframe;

(b) generate user goal attainment information based on the received physical activity data for the timeframe;

(c) generate an exercise prescription for the user for a future timeframe based on the received physical activity data and the user goal attainment information;

(d) capture content of the software application accessed by the user during engagement with the software application;

(e) store the physical activity data for the timeframe, the goal attainment information and the content accessed information in the database of the application (f) repeat steps (a), (b), (c), (d), and (e) for multiple timeframes;

(g) transmit a user's gender, user's age; the stored physical activity data for the multiple timeframes, the stored goal attainment information for the multiple timeframes and the content accessed information to a computer housing software that runs an engagement predictive algorithm; and (h) receive weighting factor information for each of the user's gender; user's age, stored physical activity data; stored goal attainment information and the content accessed information from the computer housing the engagement predictive algorithm.

8. The computing device of claim 7, the software application causing the computing device to:

generate a prediction percentage whether the user remains engaged with the software application based on the received weighting factor information for each of stored multiple timeframe physical activity timeframe, multiple timeframe goal attainment information and the multiple timeframe content accessed information and the corresponding information.

9. The computing device of claim 7, wherein the software application is resident on a web server and is accessible via the Internet.

10. The computing device of claim 7, wherein the software application automatically transmits the above-identified information to the computer housing the predictive software.

* * * * *